(12) United States Patent
Scheglmann et al.

(10) Patent No.: US 7,507,949 B2
(45) Date of Patent: Mar. 24, 2009

(54) POSITIONING DEVICE HAVING A SHAFT AXIALLY MOVABLE VIA A RING DIAPHRAGM

(75) Inventors: Gerhard Scheglmann, Ruhpolding (DE); Volker Hoefer, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/525,563

(22) Filed: Sep. 21, 2006

(65) Prior Publication Data

US 2007/0096017 A1 May 3, 2007

(30) Foreign Application Priority Data

Oct. 29, 2005 (DE) .................. 10 2005 051 893

(51) Int. Cl.
*G01D 5/34* (2006.01)
*H01J 5/02* (2006.01)

(52) U.S. Cl. .................. 250/231.13; 250/239

(58) Field of Classification Search ............ 250/231.13, 250/221, 231.17, 231.18, 239; 318/560, 318/640; 360/78.04, 78.11, 77.02, 77.03; 356/614–617; 384/91; 341/11, 13, 14
See application file for complete search history.

(56) References Cited

U.S. PATENT DOCUMENTS

| | | | |
|---|---|---|---|
| 3,082,411 A | 3/1963 | Smith | 360/100.1 |
| 4,654,725 A * | 3/1987 | Wakaizumi | 360/99.08 |
| 4,905,107 A * | 2/1990 | Klein | 360/75 |
| 5,073,710 A * | 12/1991 | Takagi et al. | 250/231.14 |
| 6,038,105 A | 3/2000 | Wood et al. | 360/106 |
| 6,304,409 B1 * | 10/2001 | Allsup | 360/77.03 |
| 6,472,658 B2 * | 10/2002 | Mayer et al. | 250/237 G |
| 6,817,267 B2 * | 11/2004 | Kobayashi et al. | 74/640 |
| 6,885,457 B1 * | 4/2005 | Michel et al. | 356/499 |
| 7,012,677 B2 * | 3/2006 | Mutschler | 356/138 |
| 7,136,249 B2 * | 11/2006 | Hoefer et al. | 360/75 |
| 2005/0134993 A1 | 6/2005 | Hoefer et al. | 360/75 |

FOREIGN PATENT DOCUMENTS

| DE | 103 57 295 | 7/2005 |
|---|---|---|
| EP | 0 978 708 | 9/2000 |

OTHER PUBLICATIONS

Search Report, European Patent Application No. 06 01 8922, dated Dec. 12, 2007 (translated).

* cited by examiner

*Primary Examiner*—Que T Le
*Assistant Examiner*—Pascal M Bui Pho
(74) *Attorney, Agent, or Firm*—Kenyon & Kenyon LLP

(57) ABSTRACT

A positioning device includes a housing and a shaft that is able to swivel relative to the housing and at one end of which an element to be positioned is attachable. The positioning device further includes a roller-bearing unit for supporting the shaft with respect to the housing, a swivel drive and a position-measuring device. The shaft is arranged in a manner that it is torsionally stiff, but axially movable relative to the housing via a ring diaphragm secured to the roller-bearing unit and to the housing.

14 Claims, 2 Drawing Sheets

POSITIONING DEVICE HAVING A SHAFT AXIALLY MOVABLE VIA A RING DIAPHRAGM

CROSS-REFERENCE TO RELATED APPLICATIONS

The present application claims priority to Application No. 10 2005 051 893.1, filed in the Federal Republic of Germany on Oct. 29, 2005, which is expressly incorporated herein in its entirety by reference thereto.

FIELD OF THE INVENTION

The present invention relates to a positioning device, which may be suitable, e.g., for precise movement of a swivel arm for a servo track writer.

BACKGROUND INFORMATION

Positioning devices of this type are often used in servo track writers (STW), where the tracks are arranged or written for magnetizable hard disks. For this purpose, a positioning device in the STW swivels a shaft, to which a swivel arm is attached. At its end, a write head is provided which is ultimately moved by the swivel motion of the shaft and is positioned in a highly precise manner, so that as many tracks as possible can be configured per unit surface area of the hard disk. The number of tracks arranged per unit surface area or unit diameter (tracks per inch) is a measure for the storage capacity of hard disks. For this reason, efforts are continuously made to achieve a track format that is as tight as possible. To permit a hard disk manufacturer to configure hard disks with a tight track format in an economical manner, it must be possible to exactly position the swivel arm of the STW within a very short time (seek and settle time).

German Published Patent Application No. 103 57 295 describes a positioning device, which has two bearing units, each made up of two ball bearings, for supporting a shaft. To support the shaft in a statically defined manner, bearings are disposed so that they are axially displaceable in the housing of the positioning device by corresponding fits. For conventional positioning devices, there is the danger that such floating bearings will not be torsionally stiff, e.g., that in response to high angular accelerations, tangential relative movements can occur between the shaft and/or the housing and the bearing.

SUMMARY

Example embodiments of the present invention may provide a positioning device which permits an improvement in the positioning accuracy, as well as shortening of the seek and settle times compared to conventional devices, e.g., even when the shaft of the positioning device is exposed to axial length changes relative to its housing, e.g., due to temperature fluctuations.

According to an example embodiment of the present invention, the positioning device includes a housing and a shaft that is able to swivel relative to the housing, and at one end of which an element to be positioned, for example, a swivel arm, is able to be attached. The positioning device further includes at least one roller-bearing unit for supporting the shaft with respect to the housing. A first part of the roller-bearing unit is connected in rotatably fixed manner to the shaft, while a second part of the roller-bearing unit is connected in rotatably fixed manner to the housing. It should be understood that rotatably fixed includes that no relative shift of the parts of the roller-bearing unit in the circumferential direction with respect to the shaft and the housing takes place during operation of the positioning device. Moreover, the positioning device includes a swivel drive that includes a stator and a rotor—the stator and rotor being movable relative to each other—as well as a position-measuring device that includes two parts that are movable relative to each other. The rotor of the swivel drive and a first part of the position-measuring device are connected to the shaft in rotatably fixed manner. The shaft is disposed in a manner that it is torsionally stiff but axially movable relative to the housing via a ring diaphragm secured to the roller-bearing unit.

The positioning device may provide that it allows a technically simple and economically favorable type of construction, and at the same time, however, may also permit an extremely precise and rapid positioning, e.g., even when the roller-bearing unit is subjected to axial loads. For example, the control response of the positioning device may also be improved so that the positioning may thereby be optimized. Although the position-measuring device and the swivel drive are connected in rotatably fixed manner to the shaft to be positioned, a tangential relative movement between the shaft and/or the housing and the roller-bearing unit may be harmful for the performance of the positioning device.

The ring diaphragm may be implemented as a circular disk having a central bore. In this context, the ring diaphragm in the relaxed state may be flat, or else as an alternative to that, may have a spatially curved shape. Thus, the ring diaphragm is a non-planar annular disk. For example, the ring diaphragm in the effective area of the free radial dimension may have a wave shape, and, e.g., may be spatially curved in a sine shape or omega shape.

So that the ring diaphragm will satisfy the demands for torsional stiffness, axial elasticity and the requirements with respect to the vibrational behavior which are significant for the functioning of the positioning device, the ring diaphragm may be produced from a metal material.

The ring diaphragm may have a closed, circular inner contour, and a closed, circular outer contour.

The overall behavior of the positioning device with regard to positioning accuracy and seek and settle time may be improved to an extraordinary degree if the arrangement of the positioning device is altered as described herein.

The second part of the roller-bearing unit may include a bushing—or is shaped as a bushing—to which the ring diaphragm is secured in rotatably fixed manner, for example, by a clamp connection or a bonded connection. On the other side, the ring diaphragm may be clamped or secured in rotatably fixed manner to the housing. Between the securing or clamping regions is a free region, which is ultimately significant for the deformation behavior and vibrational behavior of the ring diaphragm. This free region is denoted below as free radial dimension. The ring diaphragm is able to deform in the axial direction in the region of the free radial dimension.

The ring diaphragm may be implemented such that the radial measurement of the free region of the ring diaphragm is, e.g., at least 30 times, e.g., at least 40 times or 50 times, greater than the thickness of the ring diaphragm in the region of the free radial dimension. Due to the comparatively slight thickness of the ring diaphragm, not only is there sufficient axial movement of the shaft relative to the housing, but the vibrational behavior is also positively influenced. In order to be able to exhaust the full potential of such precise position-measuring devices for the positioning devices, e.g., the ring diaphragm should also be optimized with respect to its vibrational behavior. For this reason, the ring diaphragm is arranged such that no reduction in the resonance frequency of the positioning device as a whole takes place due to the use of the ring diaphragm in the positioning device. The positioning devices coming under consideration often have a resonance frequency in the range from, e.g., 0.5 to 20 kHz, e.g., in the range from 1 kHz to 10 kHz.

To dampen frequency peaks, in connection with the optimization of the vibrational behavior of the positioning device, the ring diaphragm may be arranged such that it includes a plurality of superimposed layers which, for example, may be made of different materials. In this alternative layer type of construction of the ring diaphragm, inner frictional forces develop in response to its deformation, which ultimately have a damping effect. In this example, plastic or elastomer materials may also be used.

The type of construction may be particularly advantageous if the shaft is made of a material whose coefficient of thermal expansion differs from that of the material of the housing. Often in the case of such positioning devices, the shaft should not be magnetic, and should therefore be produced from a suitable material. Therefore, ceramic materials or non-magnetic metal alloys, e.g., steel alloys, are usually used for the shaft.

The construction may be particularly advantageous for positioning devices which are equipped with highly sensitive position-measuring devices. Position-measuring devices of this type are able to operate with photoelectric scanning, e.g., according to an interferential measuring principle.

According to an example embodiment of the present invention, a positioning device includes: a housing; a shaft swiveleable relative to the housing, an end of the shaft attachable to a component to be positioned; a roller-bearing unit adapted to support the shaft with respect to the housing, a first part of the roller-bearing unit connected in rotatably fixed manner to the shaft, a second part of the roller-bearing unit connected in rotatably fixed manner to the housing; a swivel drive including a stator and a rotor, the rotor movable relative to the stator; a position-measurement device including two parts movable relative to each other; and a ring diaphragm secured to the roller-bearing unit and to the housing. The rotor of the swivel drive and a first part of the position-measurement device are connected in rotatably fixed manner to the shaft, and the shaft is arranged torsionally stiff and axially movable relative to the housing by the ring diaphragm.

The ring diaphragm may be spatially curved.

The ring diaphragm may be formed of a metal material.

The ring diaphragm may be secured to at least one of (a) the roller-bearing unit and (b) the housing by one of (a) a clamp connection and (b) a bonded connection.

The second part of the roller-bearing unit may include a bushing, and the ring diaphragm may be secured to the bushing.

The bushing may include an external thread adapted to receive a nut, and the ring diaphragm may be clamped on the bushing by the nut.

The housing may include an internal thread adapted to receive an eyebolt, and the ring diaphragm may be clamped on the housing by the eyebolt.

The shaft may be formed of a material having a coefficient of thermal expansion that differs from a coefficient of thermal expansion of a material of the housing.

A free radial dimension of the ring diaphragm may be at least 30 times greater than a thickness of the ring diaphragm.

The position-measurement device may be configured to operate by photoelectric scanning, e.g., according to an interferential measurement principle.

The first part of the position-measurement device may include a transparent phase grating, and a second part of the position-measurement device may include a reflection phase grating.

The first part of the position-measurement device may include a reflection phase grating, and the second part of the position-measurement device may include a transparent phase grating.

Further features and aspects of example embodiments of the present invention are described in more detail below with reference to the appended Figures.

DETAILED DESCRIPTION

Figure 1:
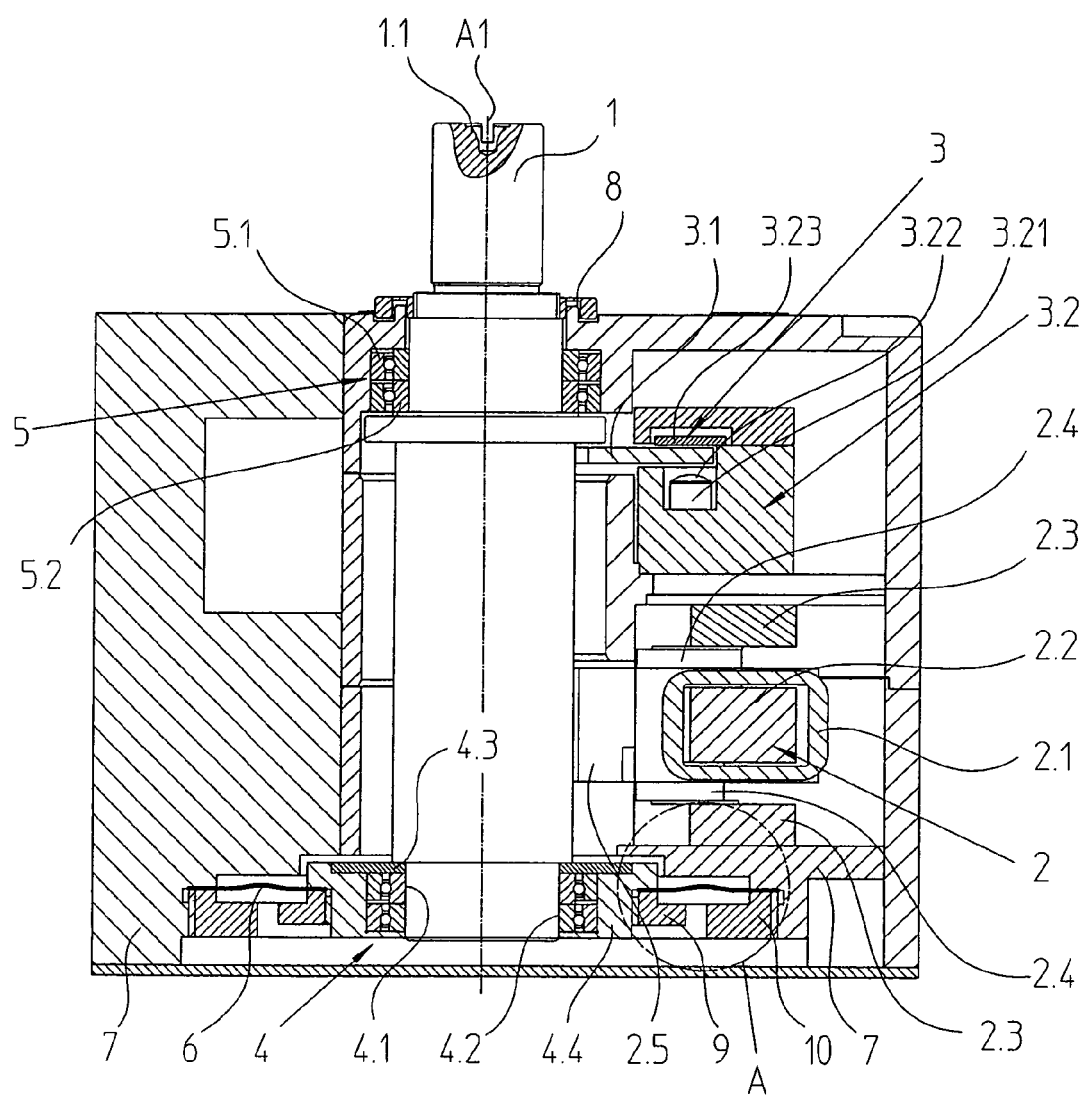
FIG. 1 is a cross-sectional view through a positioning device according to an example embodiment of the present invention.

FIG. 1 illustrates a positioning device as used in connection with STWs. Accordingly, a shaft 1 is able to swivel about an axis Al and has a shaft end 1.1, to which a swivel arm for writing to a hard disk may be attached. A seal 8 is mounted at the passage of shaft 1, which in the exemplary embodiment illustrated is made of non-magnetic spring steel, through a housing 7. In the exemplary embodiment illustrated, housing 7 is produced from an aluminum alloy.

The swivel motion—the exemplary embodiment illustrated allowing for a swiveling range of, e.g., ±90°—is initiated by a so-called voice coil motor 2, an electrical direct drive. The primary part of voice coil motor 2, which in the example illustrated functions as a rotor within the swiveling range, is made of a copper coil 2.1 surrounding a ferromagnetic core 2.2. Corresponding to the swiveling range, ferromagnetic core 2.2 extends along a graduated-circle line. The windings of copper coil 2.1 are implemented such that they come to lie parallel to the drawing plane of FIG. 1. In the operation of voice coil motor 2, ferromagnetic core 2.2 remains stationary, while copper coil 2.1 executes a swivel motion along the graduated-circle line. An intermediate piece 2.5, which is connected to shaft 1 in a rotatably fixed manner, is attached to copper coil 2.1. In this manner, the torque of voice coil motor 2 is introduced into shaft 1 for the swivel motion. Copper coil 2.1 and intermediate piece 2.5 may thus be assigned to the primary part or to the rotor of voice coil motor 2.

The secondary part is made up of permanent magnets 2.4, which are secured on magnet supports 2.3, made of ferromagnetic material, along the graduated-circle line. During operation of the positioning device, the secondary part acts similar a torque counteracting support and does not take part in the swivel motion of shaft 1, and therefore may also be referred to as a stator in the exemplary embodiment illustrated. Voice coil motor 2 thus operates according to the principle of a synchronous direct drive.

As an alternative, the primary part of voice coil motor 2 may be implemented as a printed circuit board, printed conductors being used as winding.

The swivel angle of shaft 1 is measured by a position-measuring device 3, which operates according to a similar operating principle as is described in European Published Patent Application No. 0 978 708. According to this, position-measuring device 3 is made up of a transparent phase grating 3.1 which has the shape of a segment of an annular disk, so that it is possible to scan the entire swiveling range. In this context, transparent phase grating 3.1 is connected to shaft 1 in a torsionally rigid manner, so that it takes part in the swivel movements of shaft 1.

Non-rotating scanning unit 3.2 of position-measuring device 3 is arranged opposite the phase grating. Scanning unit 3.2 is made up of a light source 3.21 which, for example, takes the form of a LED, a condenser lens 3.22 and a scale segment 3.23, as well as photodetectors for receiving the modulated light beams. Scale segment 3.23 is in the form of a reflective phase grating or an echelon grating. Thus, reflective lines, which have a height of, e.g., 0.2 µm in the example illustrated, are applied to a reflective surface. Since scale segment 3.23 does not take part in the swivel movement and is therefore always arranged opposite light source 3.21, it may be arranged to be small compared to swiveling phase grating 3.1.

During operation of the positioning device, the light generated by light source 3.21 implemented as a LED first passes through condenser lens 3.22 and subsequently through transparent phase grating 3.1, which generates diffracted beam portions and causes a phase change of the light waves. The light beams thus modified then reach scale segment 3.23 in the form of the reflective phase grating. There, they are again diffracted, and a further phase change of the light waves occurs. The reflected and diffracted light beams then pass through transparent phase grating 3.1 again, and are once more diffracted and interfere with each other. The beams of rays modulated in this manner then strike photodetectors, which are located in the region of light source 3.21 and are not visible in the sectional view of FIG. 1. The photodetectors convert the light signals into electrical signals, which are then suitably processed further to obtain the position information. The use of comparatively small scale segment 3.23 as a non-rotating part may provide that the tolerances with respect to the wobble of scale segment 3.23 do not have to be chosen to be as tight as would be the case if scale segment 3.23 were to rotate during operation.

In an alternative arrangement of position-measuring device 3, scanning unit 3.2 includes a so-called VCSEL (Vertical Cavity Surface Emitting Laser) as light source 3.21. This light source 3.21 emits a beam of rays which propagates along the direction of an optical axis. The emitted beam of rays may be a TEM 00 mode of a Gaussian beam, which is emitted by the VCSEL utilized. Because of the VCSEL radiation characteristic, the emitted beam of rays exhibits a certain divergence and is transformed by condenser lens 3.22. The beam transformation of the emitted, divergent beam of rays may occur such that, after passing through condenser lens 3.22, an approximately collimated beam of rays is formed, which has a beam throat at a certain distance from condenser lens 3.22. In this context, beam throat should be understood as the location in the beam cross-section along the direction of beam propagation at which the beam of rays has its minimum area or lateral expansion. Positioned in the region of the beam throat is phase grating 3.1, upon which the transformed beam of rays impinges. The positioning of phase grating 3.1 at this location may provide that the installation tolerance is thereby increased in both the radial or tangential direction and in the direction of beam propagation, i.e., in the axial direction. For a high installation tolerance in this direction, one should generally strive to illuminate phase grating 3.1 using a beam of rays of low divergence and a small beam diameter. Since these quantities can not be minimized arbitrarily in the case of a predefined wavelength, a compromise should be found for the most favorable positioning of phase grating 3.1. Such a compromise is obtained by positioning phase grating 3.1 in the beam throat of the emitted and transformed beam of rays, where the product of the divergence and beam diameter of the TEM 00 mode of a Gaussian beam is at a minimum. Phase grating 3.1 splits the incident beam of rays into first and second partial beams of rays, which spread out away from the optical axis. In this instance, as described in connection with the first alternative of position-measuring device 3, the beams of rays changed in this manner also strike the photodetectors, which are arranged in the region of light source 3.21. The photodetectors convert the light signals into position-dependent, electrical signals.

When using such a high-resolution interferential position-measuring device 3, optimization of the mechanically acting components may be particularly significant for achieving the greatest possible increase in precision and speed of the positioning device as a whole.

Located at shaft 1 within housing 7 are two roller-bearing units 4, 5, each of which includes two ball bearings 4.1, 4.2, 5.1, 5.2 in the exemplary embodiment illustrated. Roller-bearing unit 5 is mounted such that it serves as a locating bearing, thus is implemented as an axially rigid bearing.

Figure 2:
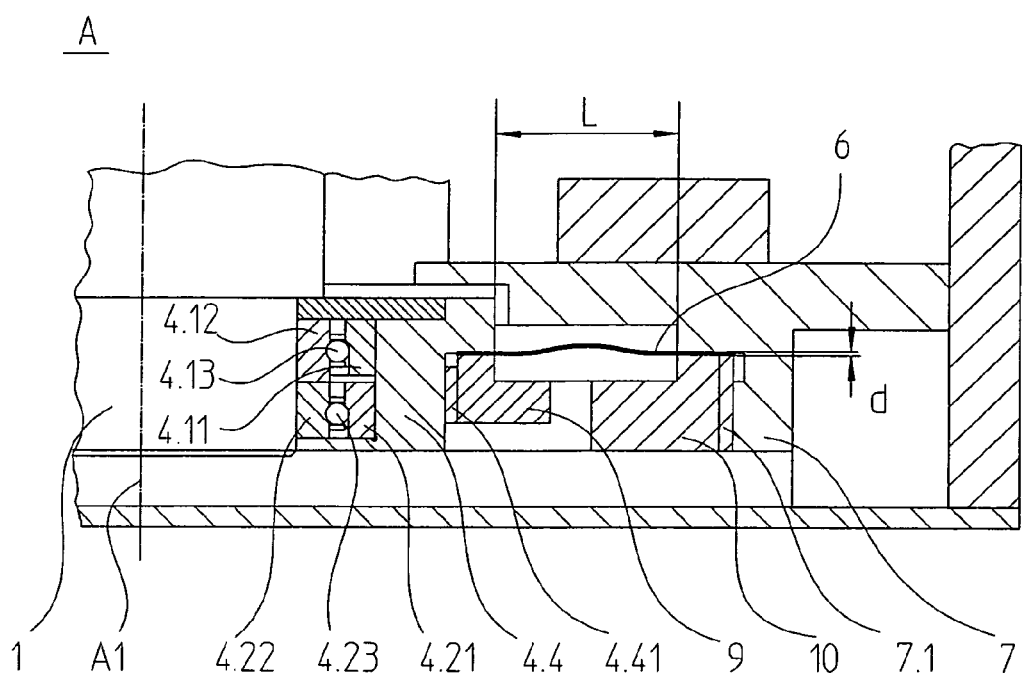
FIG. 2 is a detail view illustrating the device illustrated in FIG. 1.

In addition to the two ball bearings 4.1, 4.2, roller-bearing unit 4 includes a cover disk 4.3 and a bushing 4.4. As illustrated in FIG. 2, each of the two ball bearings 4.1, 4.2 of roller-bearing units 4 includes an inner ring 4.11, 4.21 and an outer ring 4.12, 4.22. Inner rings 4.11, 4.21 and outer rings 4.12, 4.22 are made of bearing steel. Moreover, each ball bearing 4.1, 4.2 includes balls 4.13, 4.23 as rolling elements made, for example, of ceramic material. To provide that no relative movement occurs between inner rings 4.11, 4.21 and shaft 1, or between outer rings 4.12, 4.22 and bushing 4.4, at these locations, the two ball bearings 4.1, 4.2 are bonded to shaft 1 or bushing 4.4 in rotatably fixed manner.

The coefficient of thermal expansion of the aluminum alloy of housing 7 differs from the coefficient of thermal expansion of the spring steel of shaft 1. If, for example, during transport or in operation, the positioning device is exposed to temperatures which differ from the temperatures during the assembly, then shaft 1 will expand or shorten axially relative to housing 7. To prevent excessive axial stresses from developing in these instances, a ring diaphragm 6 is arranged between roller-bearing unit 4 and housing 7. If unacceptably high stresses occur, then, given the use of balls 4.13, 4.23 made of comparatively hard ceramic material, the bearing grooves of ball bearings 4.1, 4.2 would become plastically deformed, so that minimal permanent impressions would develop there. These impressions or dents would interfere with the positioning accuracy of shaft 1, and would ultimately lead to a deterioration in the operational performance of the positioning device. But even when using other material pairings in roller-bearing units 4, 5, damage, albeit minimal, would occur, which nevertheless would have a negative effect on the operational performance of the positioning device.

Here, considered geometrically, ring diaphragm 6 is a non-planar annular member having closed, circular inner and outer contours extending around without interruptions. In the exemplary embodiment illustrated, ring diaphragm 6 has a thickness d of, e.g., 0.2 mm, with an inside diameter of, e.g., 40 mm and an outside diameter of, e.g., 75 mm. Ring diaphragm 6 is made from a spring-steel sheet.

Bushing 4.4 has an external thread 4.41. During assembly of the positioning device, initially ring diaphragm 6 is placed over bushing 4.4, so that ring diaphragm 6 comes to rest on a shoulder of bushing 4.4. After that, a nut 9 having an internal thread is screwed onto external thread 4.41 of bushing 4.4 until ring diaphragm 6 is secured against the shoulder of bushing 4.4 in circumferentially clamping fashion. In the exemplary embodiment illustrated, the radial extension of the inner clamping region is at, e.g., 2.5 mm on each side.

Analogous thereto, the outer surface of ring diaphragm 6 is clamped circumferentially against a shoulder in housing 7. For this purpose, housing 7 has an internal thread 7.1 which cooperates with an external thread of an eyebolt 10, in this context, the clamping region in each case extending to, e.g., 2.5 mm in the radial direction.

Thus, ring diaphragm 6 has an inner radius of, e.g., 20 mm (inside diameter 40 mm) and an outer radius of, e.g., 37.5 mm (outside diameter 75 mm). Accordingly, a free radial dimension L of 37.5 mm−2.5 mm−2.5 mm−20 mm=12.5 mm can therefore be calculated for ring diaphragm 6. Free radial dimension L should be understood as the free radial length between the clamping regions, which is ultimately decisive for the deformation and vibrational behavior of ring diaphragm 6. Consequently, ring diaphragm 6 is able to deform in the axial direction in the region of free radial dimension L. To improve the deformation properties of ring diaphragm 6, it is shaped in spatially curved fashion in the region of free radial dimension L. For example, ring diaphragm 6 there is substantially sinusoidally shaped, the transitions into the clamping regions being implemented as continuous, smooth transitions. In the exemplary embodiment illustrated, ring diaphragm 6 has a peak, thus a maximum deviation from the planar geometry, of, e.g., 0.6 mm.

Because ring diaphragm 6 is clamped twice inside and outside circumferentially over 360°, the spatially curved form of ring diaphragm 6 does not lead to a deterioration of the stiffness in the radial direction.

Figure 3:
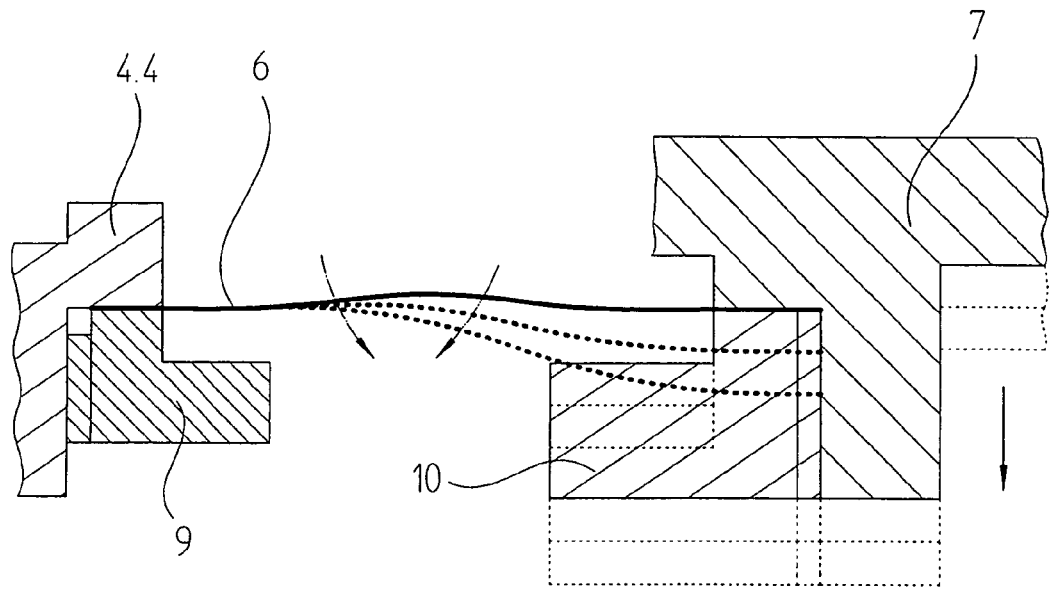
FIG. 3 illustrates a deformation of the ring diaphragm.

FIG. 3 illustrates ring diaphragm 6 in various states of deformation. These states of deformation can correspond to different temperatures of the position-measuring device. Since ring diaphragm 6 is sine-shaped, the geometry of ring diaphragm 6 has two inflection points within free radial dimension L. The curved solid line represents non-deformed ring diaphragm 6 the way it was mounted. If, because of temperature changes, e.g., during the transport of the position-measuring device, housing 7 expands compared to shaft 1, then ring diaphragm 6 deforms according to the patterns represented by broken lines. As a result of the deformations, the inflection points travel along the dot-dash arrows with progressive deformation in a manner that they lie ever closer together. Such a geometry may be particularly advantageous in view of the required axial flexibility, but also for a high torsional stiffness.

Consequently, the connection between roller-bearing unit 4 and housing 7, achieved via ring diaphragm 6, is radially stiff, and also stiff tangentially or torsionally, thus in the circumferential direction. On one hand, this is significant for exactly determining the angular position of shaft 1. On the other hand, however, an excellent control response should also exist in order to achieve short seek and settle times. The vibrational behavior of the system is also significant for the control response. Therefore, the positioning device should be arranged such that corresponding vibrations of shaft 1 are as high-frequency as possible, so that resonance effects do not occur. In a first approximation, the positioning device may be treated vibrationally like a coupled spring pendulum having springs of varying stiffness. In this model, the lowest resonance frequency is a function of the softest spring. For this reason, ring diaphragm 6 has a higher spring constant in the radial and torsional direction than roller-bearing unit 4 itself, so that ring diaphragm 6 does not cause any shift of the resonance frequency into a lower frequency range. In this manner, the seek and settle time may be further optimized. The resonance frequency of the positioning device described may be approximately 1 kHz.

In the exemplary embodiment illustrated, the ratio V of free radial dimension L to thickness d of ring diaphragm 6 is:

$$V = L/d = 12.5 \text{ mm}/0.2 \text{ mm} = 62.5$$

This ratio V is a significant characteristic for the vibrational and bearing behavior.

What is claimed is:

1. A positioning device, comprising:
   a housing;
   a shaft swivelable relative to the housing, an end of the shaft attachable to a component to be positioned;
   a roller-bearing unit adapted to support the shaft with respect to the housing, a first part of the roller-bearing unit connected in rotatably fixed manner to the shaft, a second part of the roller-bearing unit connected in rotatably fixed manner to the housing;
   a swivel drive including a stator and a rotor, the rotor movable relative to the stator;
   a position-measurement device including two parts movable relative to each other; and
   a ring diaphragm secured to the roller-bearing unit and to the housing;
   wherein the rotor of the swivel drive and a first part of the position-measurement device are connected in rotatably fixed manner to the shaft, the shaft arranged torsionally stiff and axially movable relative to the housing by the ring diaphragm.

2. The positioning device according to claim 1, wherein the ring diaphragm is spatially curved.

3. The positioning device according to claim 1, wherein the ring diaphragm is formed of a metal material.

4. The positioning device according to claim 1, wherein the ring diaphragm is secured to at least one of (a) the roller-bearing unit and (b) the housing by one of (a) a clamp connection and (b) a bonded connection.

5. The positioning device according to claim 1, wherein the second part of the roller-bearing unit includes a bushing, the ring diaphragm secured to the bushing.

6. The positioning device according to claim 5, wherein the bushing includes an external thread adapted to receive a nut, the ring diaphragm clamped on the bushing by the nut.

7. The positioning device according to claim 4, wherein the housing includes an internal thread adapted to receive an eyebolt, the ring diaphragm clamped on the housing by the eyebolt.

8. The positioning device according to claim 1, wherein the shaft is formed of a material having a coefficient of thermal expansion that differs from a coefficient of thermal expansion of a material of the housing.

9. The positioning device according to claim 1, wherein a free radial dimension of the ring diaphragm is at least 30 times greater than a thickness of the ring diaphragm.

10. The positioning device according to claim 1, wherein the position-measurement device is configured to operate by photoelectric scanning.

11. The positioning device according to claim 1, wherein the position-measurement device is configured to operate according to an interferential measurement principle.

12. The positioning device according to claim 10, wherein the first part of the position-measurement device includes a transparent phase grating, and a second part of the position-measurement device includes a reflection phase grating.

13. The positioning device according to claim 12, wherein the first part of the position-measurement device includes a reflection phase grating, and the second part of the position-measurement device includes a transparent phase grating.

14. The positioning device according to claim 1, wherein the ring diaphragm is secured to the housing in a rotatably fixed manner.

* * * * *